(12) United States Patent
Schmidt

(10) Patent No.: US 11,783,438 B2
(45) Date of Patent: Oct. 10, 2023

(54) SYSTEMS, METHODS AND APPARATUS FOR PROPERTY DEFECT MANAGEMENT

(71) Applicant: Mark Hamilton Schmidt, Cincinnati, OH (US)

(72) Inventor: Mark Hamilton Schmidt, Cincinnati, OH (US)

(*) Notice: Subject to any disclaimer, the term of this patent is extended or adjusted under 35 U.S.C. 154(b) by 0 days.

(21) Appl. No.: 17/363,426

(22) Filed: Jun. 30, 2021

(65) Prior Publication Data

US 2021/0327006 A1 Oct. 21, 2021

Related U.S. Application Data

(63) Continuation of application No. 17/035,092, filed on Sep. 28, 2020, now Pat. No. 11,080,802, which is a continuation of application No. 15/958,700, filed on Apr. 20, 2018, now Pat. No. 10,789,660, which is a continuation of application No. 14/095,138, filed on Dec. 3, 2013, now abandoned.

(60) Provisional application No. 61/783,938, filed on Mar. 14, 2013, provisional application No. 61/735,308, filed on Dec. 10, 2012.

(51) Int. Cl.
*G06Q 50/16* (2012.01)
*G06Q 10/063* (2023.01)

(52) U.S. Cl.
CPC ........ *G06Q 50/163* (2013.01); *G06Q 10/063* (2013.01)

(58) Field of Classification Search
None
See application file for complete search history.

(56) References Cited

U.S. PATENT DOCUMENTS

| | | | | |
|---|---|---|---|---|
| 4,396,942 A | * | 8/1983 | Gates | G01C 15/00 386/230 |
| 9,416,499 B2 | * | 8/2016 | Cronin | E01C 23/06 |
| 2008/0082347 A1 | * | 4/2008 | Villalobos | G07C 5/008 705/305 |

OTHER PUBLICATIONS

"Selecting a Preventative Maintenance Treatment for Flexible Pavements"; USDOT, FHWA, Aug. 2000 (Year: 2000).*

* cited by examiner

*Primary Examiner* — Dennis W Ruhl
(74) *Attorney, Agent, or Firm* — Frost Brown Todd LLP

(57) ABSTRACT

Systems and methods are provided that utilize GPS mapping and a web-based data management as a platform for defining, measuring and tracking aspects of a building or grounds.

10 Claims, 18 Drawing Sheets

| Ref. No. | Defect Type |
|---|---|
| 1 | Block Cracking |
| 2 | Broken Curb - Asphalt |
| 3 | Broken Curb - Barrier |
| 4 | Broken Curb - Curb and Gutter |
| 5 | Broken Curb - Extruded Concrete |
| 6 | Concrete |
| 7 | Crack failure |
| 8 | Crack Fill Measurement - 50% |
| 9 | Crack Fill Measurement - 100% |
| 10 | Edge Cracking |
| 11 | Fatigue Cracking |
| 12 | Fatigue Cracking - Utility Structure |
| 13 | Fence |
| 14 | Light Lamp |
| 15 | building and grounds Markings |
| 16 | Perimeter Ponding - Backfill |
| 17 | Perimeter Ponding - Spillway |
| 18 | Pothole In building and grounds |
| 19 | Pothole Off building and grounds |
| 20 | Raveling |
| 21 | Rutting |
| 22 | Miscellaneous Defect |
| 23 | Settlement - Depression |
| 24 | Settlement - Ponding |
| 25 | Shoving |
| 26 | Sinkhole |
| 27 | Tree Root Damage |
| 28 | Utility Structure |
| 29 | Water Intrusion |

FIG. 4

| Key # | DNID | Defect Name | Severity | CMDI | <15,001 | 15,001-60,000 | >60,000 |
|---|---|---|---|---|---|---|---|
| 1 | BC1 | Block Cracking | Minor | | Seal coat | Seal coat | Seal coat |
| 1 | BC2 | Block Cracking | Moderate | | 2" Asphalt Overlay | 2" Asphalt Overlay | 2" Asphalt Overlay |
| 1 | BC3 | Block Cracking | Major | | 2" Asphalt Overlay | 2" Asphalt Overlay | 2" Asphalt Overlay |
| 1 | BC4 | Block Cracking | Structural | | 2" Asphalt Overlay | 2" Asphalt Overlay | 2" Asphalt Overlay |
| 2 | BRCA1 | Broken Curb - Asphalt | Minor | | Remove and replace asphalt curb | Remove and replace asphalt curb | Remove and replace asphalt curb |
| 2 | BRCA2 | Broken Curb - Asphalt | Moderate | D | Remove and replace asphalt curb | Remove and replace asphalt curb | Remove and replace asphalt curb |
| 2 | BRCA3 | Broken Curb - Asphalt | Major | N | Remove and replace asphalt curb | Remove and replace asphalt curb | Remove and replace asphalt curb |
| 2 | BRCA4 | Broken Curb - Asphalt | Structural | C | Remove and replace asphalt curb | Remove and replace asphalt curb | Remove and replace asphalt curb |
| 3 | BRCB1 | Broken Curb - Barrier | Minor | | Remove and replace barrier curb | Remove and replace barrier curb | Remove and replace barrier curb |
| 3 | BRCB2 | Broken Curb - Barrier | Moderate | D | Remove and replace barrier curb | Remove and replace barrier curb | Remove and replace barrier curb |
| 3 | BRCB3 | Broken Curb - Barrier | Major | N | Remove and replace barrier curb | Remove and replace barrier curb | Remove and replace barrier curb |
| 3 | BRCB4 | Broken Curb - Barrier | Structural | C | Remove and replace barrier curb | Remove and replace barrier curb | Remove and replace barrier curb |
| 4 | BRCC1 | Broken Curb - Curb | Minor | | Remove and replace curb and gutter | Remove and replace curb and gutter | Remove and replace curb and gutter |

| Priority | Total # of Defects | Immediate Treatment Costs | Maintenance Cost | Repair Cost | Reconstruction Cost |
|---|---|---|---|---|---|
| 1 | 135 | $ 1,500 | $ 7,300 | $ 82,350 | $ - |
| 2 | 9 | $ 30 | $ 2,159 | $ 323 | $ - |
| 3 | 52 | $ 2,200 | $ 4,250 | $ 3,458 | $ - |
| Total | 196 | $ 3,730 | $ 13,709 | $ 86,131 | $ - |

FIG. 9

MAINTENANCE BUDGET SUMMARY

| Priority | Extended Price | Immediate | Year 1 | Year 2 | Year 3 |
|---|---|---|---|---|---|
| 1 | $ 1,500 | $ - | $ 1,500 | $ - | $ - |
| 2 | $ 1,000 | $ - | $ 1,000 | $ - | $ - |
| 3 | $ 2,000 | $ - | $ 2,000 | $ - | $ - |
| Total | $ 4,500 | $ - | $ 4,500 | $ - | $ - |
| Budget | $ 4,000.00 | $ - | $ 4,000.00 | $ - | $ - |
| Variance | $ (500) | $ - | $ (500) | $ - | $ - |

[INCREASE] [DECREASE]

[DRILL DOWN]

FIG. 11B

MAINTENANCE BUDGET SUMMARY

| Priority | Extended Price | Immediate | Year 1 | Year 2 | Year 3 |
|---|---|---|---|---|---|
| 1 | $ 1,500 | $ - | $ 1,500 | $ - | $ - |
| 2 | $ 1,000 | $ - | $ 1,000 | $ - | $ - |
| 3 | $ 2,000 | $ - | $ 2,000 | $ - | $ - |
| Total | $ 4,500 | $ - | $ 4,500 | $ - | $ - |
| Budget | $ 4,000.00 | $ - | $ 4,000.00 | $ - | $ - |
| Variance | $ (500) | $ - | $ (500) | $ - | $ - |

[INCREASE] 1104  [DECREASE] 1106

1108 (highlighting the 2,000 in Year 1, Priority 3)

1110 [DRILL DOWN]

FIG. 13

SYSTEMS, METHODS AND APPARATUS FOR PROPERTY DEFECT MANAGEMENT

CROSS-REFERENCE TO RELATED APPLICATIONS

This application is a continuation of U.S. patent application Ser. No. 17/035,092, filed on Sep. 28, 2020, entitled "SYSTEMS, METHODS AND APPARATUS FOR PROPERTY DEFECT MANAGEMENT", now U.S. Pat. No. 11,080,802, which is a continuation of U.S. patent application Ser. No. 15/958,700, filed on Apr. 20, 2018, entitled "SYSTEMS, METHODS AND APPARATUS FOR PROPERTY DEFECT MANAGEMENT", now U.S. Pat. No. 10,789,660, which is a continuation of U.S. patent application Ser. No. 14/095,138, filed on Dec. 3, 2013, entitled "SYSTEMS, METHODS AND APPARATUS FOR PROPERTY DEFECT MANAGEMENT", now abandoned, which claims the benefit of U.S. provisional patent application Ser. No. 61/735,308, filed on Dec. 10, 2012, entitled "PROPERTY DEFECT MANAGEMENT SYSTEM AND METHOD," and U.S. provisional patent application Ser. No. 61/783,938, filed on Mar. 14, 2013, entitled "SYSTEMS, METHODS AND APPARATUS FOR PROPERTY DEFECT MANAGEMENT," the disclosures of which are hereby incorporated by reference herein in their entirety.

BACKGROUND

Parking lots, driveways, and roadways are generally in a constant state of deterioration. Over time, numerous types of defects appear and then worsen. Example defects include block cracking, broken curbs, fatigue cracking, potholes, rutting, and the like. Moreover, buildings and their surrounding grounds tend to deteriorate, become damaged, over time.

BRIEF DESCRIPTION OF THE DRAWINGS

The present disclosure will be more readily understood from a detailed description of some example embodiments taken in conjunction with the following figures:

FIG. 4 depicts an example table of reference numbers and defect types.

FIG. 5 depicts a portion of an example table of treatments.

FIG. 6 depicts a portion of a report generated in accordance with the present disclosure.

FIG. 9 depicts an example maintenance, repair, reconstruction (MRR) cost table.

FIGS. 11A-11D illustrates an example simplified maintenance budget summary and an interaction therewith depicting the iterative deferring of costs.

FIGS. 12A-12B depict an example bid form generated by a property defect management system.

FIG. 13 depicts an example content management system user interface.

DETAILED DESCRIPTION

Figure 1:
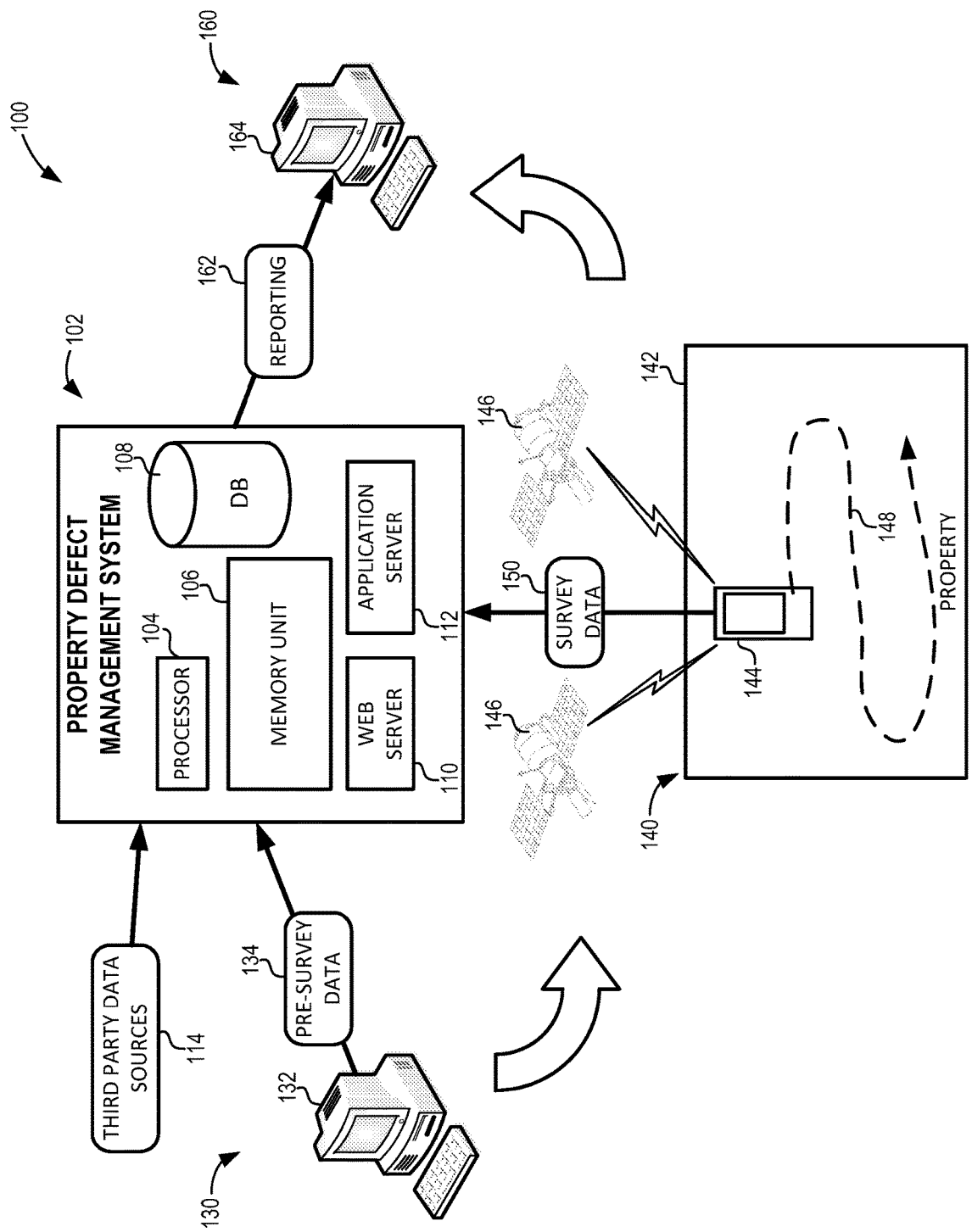
FIG. 1 depicts a system flow diagram of an example property defect management system.

Various non-limiting embodiments of the present disclosure will now be described to provide an overall understanding of the principles of the structure, function, and use of the property defect management systems and methods disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures, or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term software is used expansively to include not only executable code, but also data structures, data stores, and computing instructions in any electronic format, firmware, and embedded software. The terms information and data are used expansively and can include a wide variety of electronic information, including but not limited to machine-executable or machine-interpretable instructions; content such as text, video data, and audio data, among others; and various codes or flags. The terms information, data, and content are sometimes used interchangeably when permitted by context.

The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems, or methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Example embodiments described herein can include a geographic overlay system (GOS) as well as an information system, a mapping system interface to communicate with a database of building envelope/infrastructure defects that can include private or public property geographic boundaries and data files. The GOS can utilize a client/server model that streams geographic data layers inside a client browser. The GOS can employ a dynamically rendered vector-based map layer inside a client browser. The GOS can employ property building and grounds specific defects which can be captured utilizing GIS positioning, communications, and mobile devices that can accurately identify point, line or polygon objects. A database interface can enable users to organize data into a predictive analytical budgeting tool for maintenance, repair, and reconstruction (MRR) treatment activities. In some embodiments, the treatment activities can be organized into an automated Request For Quotation (RFQ) template.

The systems and methods describer here can further promote geographic bundling of projects and generate job leads for greater contractor participation in the MRR market place. RFQs can be deployed into a reverse-auction purchasing platform. GPS/GIS technology can allow tracking of projects through a secure cloud portal. Project to portfolio status maps and dashboards can enhance user experience.

While many of the example embodiments are described in the context of pavement defects, this disclosure is not so limited. As is to be appreciated, the systems and methods described herein have applicability across a wide variety of environments and operational platforms. By way of example, the systems and methods described herein can be used in connection with any suitable property, such as fencing, patios, lighting, bridge decks, parking garages, building façades, sidewalks, confirming ADA compliance, HVAC, windows, and so forth.

Depending on the application, the particular types of defected (or other types of data, issues, or points of interest) collected by the system will vary. Below are example types of data that can be collected and analyzed for various operational environments. For asphalt-related applications, data can collected and analyzed related to fatigue cracking, potholes, ponding, sinkholes, and so forth. For concrete-related applications, data can be collected and analyzed related to meander cracking, spalling, transverse slab cracks, curbing problems, and so forth. For landscaping-related applications, data can be collected and analyzed related to plant condition, mulching, slope/drainage, irrigation, and so forth. For roofing, data can be collect and analyzed regarding leaks, cracks, missing shingles, gutters, chimneys, and so forth.

As described in more detail below, the systems and methods described herein can utilize GPS mapping and web-based data management to provide a platform for parking facility safety, maintenance, and repair. In certain embodiments, systems and methods are designed for facility management personnel, or other suitable users, such as property managers, contractors, and so forth. Generally, the systems and methods described herein can define, measure, analyze, improve and control the supply chain process for facility management. For example, the systems and methods described herein can improve organizational productivity and can reduce the cost in terms of time and money associated with maintenance, repair and reconstruction (MRR) projects. Moreover, certain embodiments can help generate a facility management plan that can, for example, provide savings year over year on facility MRR. Moreover, human resource costs can potentially be reduced.

As a non-limiting example, additional details will now be provided in the context of example parking facility surveys. As is to be readily appreciated, generally analogous techniques can be used for other environments, such as building structures, landscaping, roadways, campus grounds, and so forth. As such, while the embodiments described below are in terms of identified "defects," other embodiments utilizing the presently disclosed systems and methods can identify other types of points of interest to the user. In any event, in accordance with certain embodiments, a surveyor operating handheld data collection device can walk a parking facility to visually identify defects, or other issues of interest. Upon coming across a defect, the surveyor can use the handheld data collection device to collect geospatial information regarding the defect, and, in some case, a digital imagery (such as a photograph and/or video) of the defect. Through interactions with the software executing on the handheld data collection device, the surveyor can identify the particular type of defect and provide an assessment of severity. The survey data can then be provided to a central computing system for further processing, analysis, and reporting, as described in more detail below.

FIG. 1 depicts a system flow diagram 100 of an example property defect management system 102 in accordance with one non-limiting embodiment. The system flow diagram 100 includes three general phases, a pre-survey phase 130, a surveying phase 140, and a reporting phase 160, each of which are described in more detail below.

The property defect management system 102 is configured to communicate with various entities to provide and receive data and to generate several types of reports and documents that can be useful to a user. The property defect management system 102 can be provided using any suitable processor-based device or system, such as a personal computer, laptop, server, mainframe, or a collection (e.g., network) of multiple computers, for example. The property defect management system 102 can include one or more processors (e.g., 104) and one or more computer memory units (e.g., 106). For convenience, only one processor 104 and only one memory unit 106 are shown in FIG. 1. The processor 104 can execute software instructions stored on the memory unit 106. The processor 104 can be implemented as an integrated circuit (IC) having one or multiple cores. The memory unit 106 can include volatile and/or non-volatile memory units. Volatile memory units can include random access memory (RAM), for example. Non-volatile memory units can include read only memory (ROM), for example, as well as mechanical non-volatile memory systems, such as, for example, a hard disk drive, an optical disk drive, etc. The RAM and/or ROM memory units can be implemented as discrete memory ICs, for example.

The memory unit 106 can store executable software and data, such that when the processor 104 of the property defect management system 102 executes the software, the processor 104 can be caused to perform the various operations of the property defect management system 102, such as receive information from computer devices, process defect data and treatment data, and generate budgetary tools, as discussed in more detail below. Data used by property defect management system 102 can be from various sources, such as from database 108, third party data sources 114, and/or other types of electronic data stores. The database 108 can include defect database, a treatment database, pricing database, or any data that can be useful to the system. The data stored in the database 108 can be stored in a non-volatile computer memory, such as a hard disk drive, a read only memory (e.g., a ROM IC), or other types of non-volatile memory. Also, the data associated with the database 108 can be stored on a remote electronic computer system, for example.

As shown in FIG. 1, the property defect management system 102 can include several computer servers. For example, the property defect management system 102 can include one or more web servers (e.g., 110) and application servers (e.g., 112). For convenience, only one web server 110 and one application server 112 are shown in FIG. 1, although it should be recognized that this disclosure is not so limited. The web server 110 can provide a graphical web user interface through which users of the system can interact with the property defect management system 102. The web server 110 can accept requests, such as HTTP requests, from clients, and serve the clients responses, such as HTTP responses, along with optional data content, such as web pages (e.g., HTML documents) and linked objects (such as images, etc.).

The application server 112 can provide a user interface for users who do not communicate with the property defect management system 102 using a web browser. Such users can have special software installed on a computing device 132 or 164 that allows them to communicate with the application server 112 via a communications network. Such software can be downloaded, for example, from the property defect management system 102, or other software application providers.

Although FIG. 1 depicts a limited number of elements for purposes of illustration, it can be appreciated that the property defect management system 102 can include more or less elements as well as other types of elements in accordance with the described embodiments. Elements of the property defect management system 102 can include physical or logical entities for communicating information implemented as hardware components (e.g., computing devices, processors, logic devices), executable computer program instructions (e.g., firmware, software) to be executed by various hardware components, or a combination thereof, as desired for a given set of design parameters or performance constraints.

Interactions with the property defect management system 102 for a particular property can generally occur in phases. In a pre-survey phase 130, a user (such as property owner, facilities manager, and so forth) can interact with the property defect management system 102 using a computing device 132. Computing device 132 can be any suitable type of computing device can be used to interact with the property defect management system 102, such as laptop computers, desktop computers, mobile communication devices, tablet computers, smartphones, netbook computers, and the like.

In some embodiments, pre-survey data 134 can be transmitted to the property defect management system 102 in response to questions presented to the user by a pre-survey questionnaire. Generally, the pre-survey data 134 can be used to capture client objectives. In some embodiments, the pre-survey data 134 is captured through a web-based interface or an application-based interface provided by the computing device 132. By way of the pre-survey questionnaire, priorities are set for each segment of a property. Priorities, names of segments, and other profiling data can be stored by the property defect management system 102 in suitable databases 108. In one embodiment, the pre-survey questionnaire can be designed to collect vital information about the project building and grounds. The questionnaire can be performed with the person who is most familiar with the current building and grounds conditions (generally referred to herein as a "user"). The information collected by the pre-survey questionnaire can include dumpster locations, known building and grounds defects, facility labels, facility priorities, and traffic conditions, and so forth. This can help to better process and represent the field data collected by the surveyor. In addition to gathering information from the user, information can also be gathered electronically, can be gathered using API's from various sites, and can otherwise be collected in any suitable manner from third party data sources 114. In some embodiments, during the pre-survey questionnaire, images and descriptions of the different defects are provided by the users via the computing device 132.

As is to be readily appreciated, the particular information sought during the pre-survey questionnaire will vary across applications. For parking facilities, for example, the questionnaire may request the locations of dumpsters or areas of heavy traffic. Other types of property applications can request other types of data from the user. In some embodiments, the user completing the survey can supply a response via an interactive map presented by the property defect management system 102 on the computing device 132, such as by selecting a particular area with a cursor or otherwise indicating a particular geographic area. Other relevant information can also be indicated on an interactive map by the use, such as water intrusion, potholes, various types of cracking, faded building and grounds markings, ponding on and off building and grounds, raveling, rutting, settlement, shoving, sinkholes, tree root damage, damage to utility structures, and so forth.

If a user has a particular naming convention for various portions of facilities, such information can be provided and stored by the property defect management system 102. As described in more detail below, the names of the various portions of the facilities (such as Road1, Road2, etc.) can be used when the property defect management system 102 generates various reporting documentation, such as budgeting documents and RFQs. Additionally, priorities for various portions of the facilities can be stored by the property defect management system 102, as identified by the user. These priority values can be used to determine the facility management plant. In the context of a parking facility, high traffic areas may be considered a high priority. In the context of landscaping, certain mulch beds or flower beds may be considered high priority due to their locations on a property, or for any other reason. In any event, the priority can be stored by the system as numerical value.

Once the property defect management system 102 has stored the information from the pre-survey questionnaire, then field surveying, as shown by surveying phase 140 in FIG. 1, can be commenced at a property. A surveyor can operate a handheld data collection device 144 to collect geospatial information regarding identified defects of the property 142. Defects can be classified and severity noted, as described in more detail below with regard to FIG. 2. While the type of defects collected and identified will vary based on application, for parking facility implementations, defects can be classified according to a standard building and grounds Condition Rating Scale, or according to any other suitable rating system. For example, in certain embodiments, defect conditions can be logged in accordance with ASTM Standard D6433-11, entitled "Standard Practice for Roads and Parking Lots Pavement Condition Index Surveys", using the Pavement Condition Index (PCI) method of quantifying pavement condition. Generally PCI methodology is a numerical indicator that rates the surface condition of pavement. PCI provides a measure of the present condition of the pavement based on visual recording of the type, extent and severity of pavement distress in each section. It provides an objective and rational basis for determining maintenance and repair needs and priorities. PCI methodology relies on a field survey of defects taken from sample segments to provide a normalized score allowing for a quick comparison of segment condition. Based on the number of sample units in the total section, a certain number of these units are selected to be tested. Using the techniques described herein, however, 100% of a particular property, or at least a high majority of a property, can be surveyed, with identified defects inventoried and rated to give a user high confidence ratings in the data collected. Based on the ratings of data collected, specific treatment strategies which are generalized into three categories (Maintenance, Repair, and Reconstruction), as described in more detail below.

The handheld data collection device 144 can be any suitable device, such as a GNSS handheld mapping device, smartphone, tablet computer, and the like. The handheld data collection device 144 can be utilized for GIS data collection and mapping that can operate with the GOS. The handheld data collection device 144 can communicate with satellites 146 such that a path 148 travelled by the surveyor can be tracked and logged. The handheld data collection device 144 can include various components for allowing a user to interact with its software, such as a display for presenting the user interface and a keypad for inputting data and/or commands. The handheld data collection device 144 can include other components for use with one or more applications such as a stylus, a touch-sensitive screen, keys (e.g., input keys, preset and programmable hot keys), buttons (e.g., action buttons, a multidirectional navigation button, preset and programmable shortcut buttons), switches, a microphone, speakers, an audio headset, a digital camera, a digital video recorder, and so forth. Through the interface, the surveyor can interact with the handheld data collection device 144.

The handheld data collection device 144 executes software that generally gives a user the ability to wirelessly capture, edit and store qualitative and quantitative data at a specific location at the property 142. As is to be appreciated, the software can be customized for any building envelope and infrastructure type, including the type of defects that can be logged. Individual defects can be measured quantitatively, with attributes associated with each particular defect type. Digital imagery of each defect can also be collected to document its present condition. Digital imagery can generally include still photographs, videos, thermal imagery, and any other form of imagery useful for a particular application.

In some embodiments, measuring the geographic shape and location of the defect can be performed by marking the location of a point defect, walking the length of a linear defect, or walking the perimeter of a polygon defect while the handheld data collection device 144 records the path. Depending on the type of defect, the software of the handheld data collection device 144 can request supplemental information from the surveyor.

Figure 2:
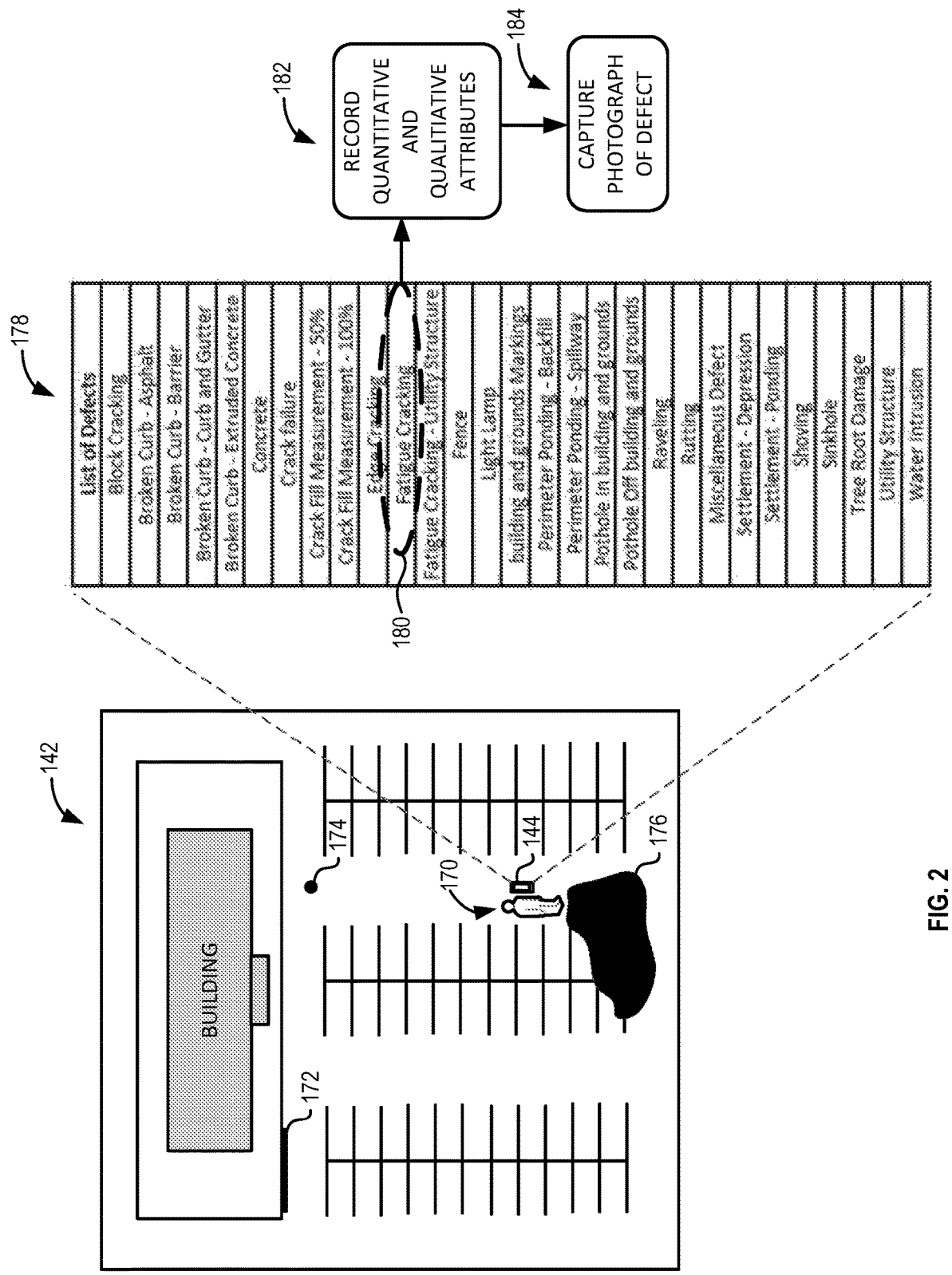
FIG. 2 depicts an example interaction between a surveyor and a handheld data collection device.

Referring now to FIG. 2, an example interaction between a surveyor 170 and the handheld data collection device 144 is illustrated. The surveyor 170 is positioned at the property 142 and operating the handheld data collection device 144 to collect survey data regarding defects. As illustrated, the property 142 has a curb defect 172 (i.e., a linear defect), a pot hole defect 174 (i.e., a point defect) and a fatigue cracking defect 176 (i.e., a polygon defect). To log data regarding the fatigue cracking defect 176, the surveyor 170 walks the perimeter of the defect while the handheld data collection device 144 geospatially tracks his movements. Before, during, or after completing the path around the a fatigue cracking defect 176, the software operating on the handheld data collection device 144 displays a list of defects 178, or otherwise allows the surveyor to identify the defect that is being surveyed. As is to be readily appreciated, the particular defects that are found within the list can vary based on application. In the illustrated embodiment, the surveyor selects fatigue cracking 180 from the list of defects 178. Such selection can be made through any suitable input means, such as using a touch sensitive screen of the handheld computing device, a keyboard, a stylus, and so forth. Next, the surveyor records quantitative and qualitative attributes 182 of the defect. Example quantitative and qualitative attributes can include, a depth of pothole, the width and density of cracks, and so forth. Other observations can also be logged, such as visibility of painted lines. Each defect can be assigned a severity level (i.e., 1-4) and stored by the handheld data collection device 144. A digital imagery of the defect 184 (such as a photograph and/or video) can be collected by the handheld data collection device 144 using an onboard camera and associated with the geospatial data collected. In some embodiments, imagery is collected with a device separate from the handheld data collection device 144, such as by a thermal imaging device, and provided to the property defect management system 102. Geospatial data, quantitative data, qualitative data, and photographic data (generally referred to as "survey data") can be stored by the handheld data collection device 144 for each defect found during the survey.

Referring again to FIG. 1, subsequent to a survey, the survey data 150 is then transmitted to the property defect management system 102 for processing. In the some embodiments, the handheld device can communicate with the property defect management system 102 through a suitable data communication network, such as a 3G/4G cellular network and/or a wireless network, to supply the survey data to the property defect management system 102 in real time or near-real time. In other embodiments, a disk or memory card can be removed from the handheld data collection device 144 and read by the property defect management system 102.

Generally, the data collected during the surveying process can be organized and managed by the property defect management system 102 using geodatabases (GDB). Certain embodiments can utilize a geographic information system (GIS) that can be comprised of a GIS database that can allow for a central location for data repository for the spatial data collected from the global navigation satellite system. During processing of the survey data 150, relational databases can be generated that are stored by the property defect management system 102 that link data collected in the field with data used to create a cost summary and/or other types of reports. Examples of linked data include, but are not limited to, repair type by defect/severity, unit cost by repair type, and extended cost by defect. The list of linked data can vary based on building envelope, infrastructure type, among other factors. In certain embodiments, the relational database can be configured for use by a budgeting module that can be utilized by a user. Additional details are provided below regarding a user's ability to access this data, such as through a mobile computing device.

Figure 3:
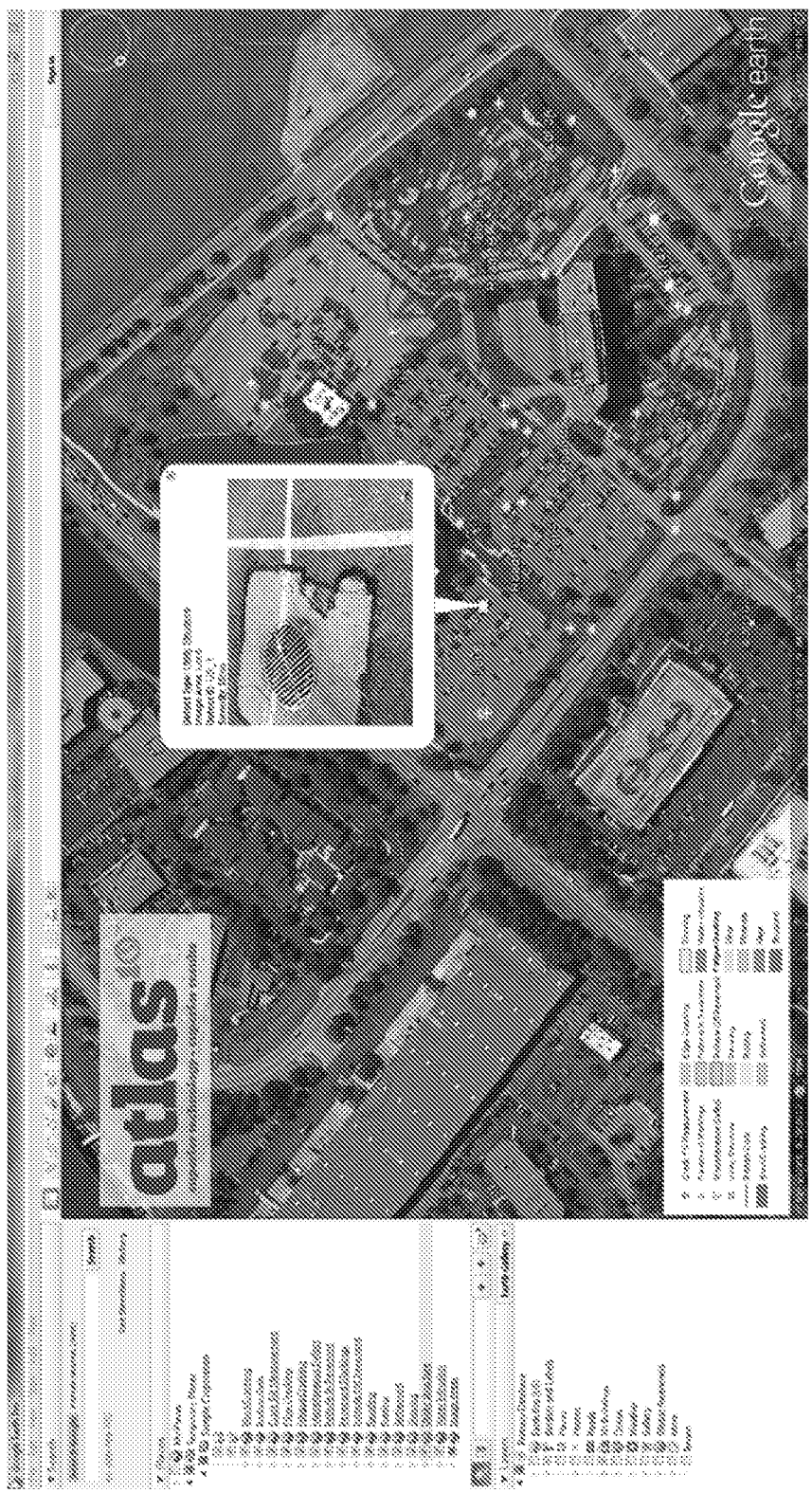
FIG. 3 depicts an example map generated in accordance with the present disclosure.

Processing the survey data can comprise layering the defects onto a map of the property at the appropriate geolocational positions. The map can have various regions labeled according the naming convention of the user, or any other naming convention. As example map is depicted in FIG. 3. The map can have a base map layer that is, for example, an aerial image of the property and one or more data layers that includes graphical indications of the various defects. Each defect appearing on the map can include optionally viewable data, such as a defect name, severity, priority, location, a photograph of the defect, and so forth. As is to be appreciated, the particular format or style in which defects are presented on the map by the property defect management system 102 may vary. In certain embodiments, defects are presented on the map in a color coded format such that similar defects are presented as the same color. In some embodiments, the property map along with the defects is viewable on an interactive map, such as provided by Google® Earth. In some embodiments, data regarding the defects are combined using Keyhole Markup Language (KML), although this disclosure is not so limited. The KML files may be compressed (i.e., to a .kmz file) for distribution to a user. In other embodiments, the mapping data is generally maintained by the property defect management system 102 and selectively accessible by a user. In any event, the map can present the individual defects as interactive elements, such that when a user activates (i.e., clicks on the interactive element) information regarding that defect is presented to the user. Other types of menus and commands can be provided to the user to allow, for example, viewing of a particular type of defect, view by severity, view by priority, and so forth. The maps can be presented on any suitable viewing device, such as a facility manager's smartphone, for example. Example interfaces for a smartphone are discussed in more detail below with regard to FIG. 14. As a user views the map on a computing device, the map is presented to scale with defects appearing on the map in the appropriate scale. Furthermore, the mapping data can be converted into various formats, such as CAD format, for use by digital estimating software.

The property defect management system 102 can create a wide variety of reports, such as a Life Cycle Cost Analysis (LCCA), a Maintenance, Repair and Reconstruction (MRR) Threshold, inventory of defects and a virtual tour of all properties in a portfolio can be provided to help with decision making, as illustrated by reporting phase 160 in FIG. 1. Some or all of the reporting 162 may be viewable on a computing device 164. The computing device 164 can be any suitable device, such as a laptop computer, a desktop computer, a mobile communication device, tablet computer, smartphones, netbook computer, and the like. In some embodiments, computing device 132 and computing device 164 are the same device, The computing device 164 can execute an application, sometimes referred to as an "app," that allows a user of the computing device 163 to communicate with the property defect management system 102. Through this app, a user can view maps showing surveyed defects, view and interact with budgeting data, view photos of defects, for example, as described in more detail below with regard to FIG. 14.

In some embodiments, in order to generate reporting documentation 162, each type of defect is given a reference number that is used by the system for tracking purposes. An example table of reference numbers and defect type that is applicable to a parking facility defects is depicted in FIG. 4. It is noted that the particular defects listed in the table of FIG. 4 can correspond with the available defects the surveyor can use when cataloging defects during the site survey illustrated in FIG. 2. In addition, the property defect management system 102 can store a recommended treatment list for each defect at each level of severity. The recommended treatment can be further characterized by property size, climate, or any other factors. A portion of an example table of treatments is depicted in FIG. 5. In the illustrated table, treatments are provided for minor, moderate, major, and structural levels are severity. Again, in the illustrated embodiment, they are the categories a surveyor can use when cataloging defects during the site survey. Other severity levels, or ways of segregating types of treatments for a defect (or other surveyed issue), can be used without departing from the scope of the present disclosure. The table of treatments can also include price breakdowns based on materials, labor costs, regions of the country, volume, and so forth.

Generally, through use of the reporting provided by the property defect management system 102, costs associated with parking facility maintenance, repair and reconstruction (MRR) can be reduced. Namely, through processing the data collected by the surveyor, user preferences, and data collected from other sources, the system can recommend a facility management plan based on ownership objectives, current building and grounds conditions, and financial resources available to treat those conditions. The report may be useful as an immediate project planning tool as well as a multi-year predictive management tool. Through the data processing and reporting functionality of the property defect management system 102, observations, recommendations, and next steps can be provided to a user, as described in more detail below.

Merely by way of example, in one embodiment, observations can include segment designations and priority overviews, a defect overview, a defect heat map, an individual facility overview, a Google® Earth Virtual Tour Sample, and defect photos. Example recommendations can include an MRR threshold, an extended pricing summary, an immediate defect map a Year 1 defect map, a Year 2 defect map, a Year 3 defect map, a cost analysis, and a service maintenance cost analysis. Example next steps can include a sample bid form, a sample of repair specifications, a budget tool.

Figure 6:
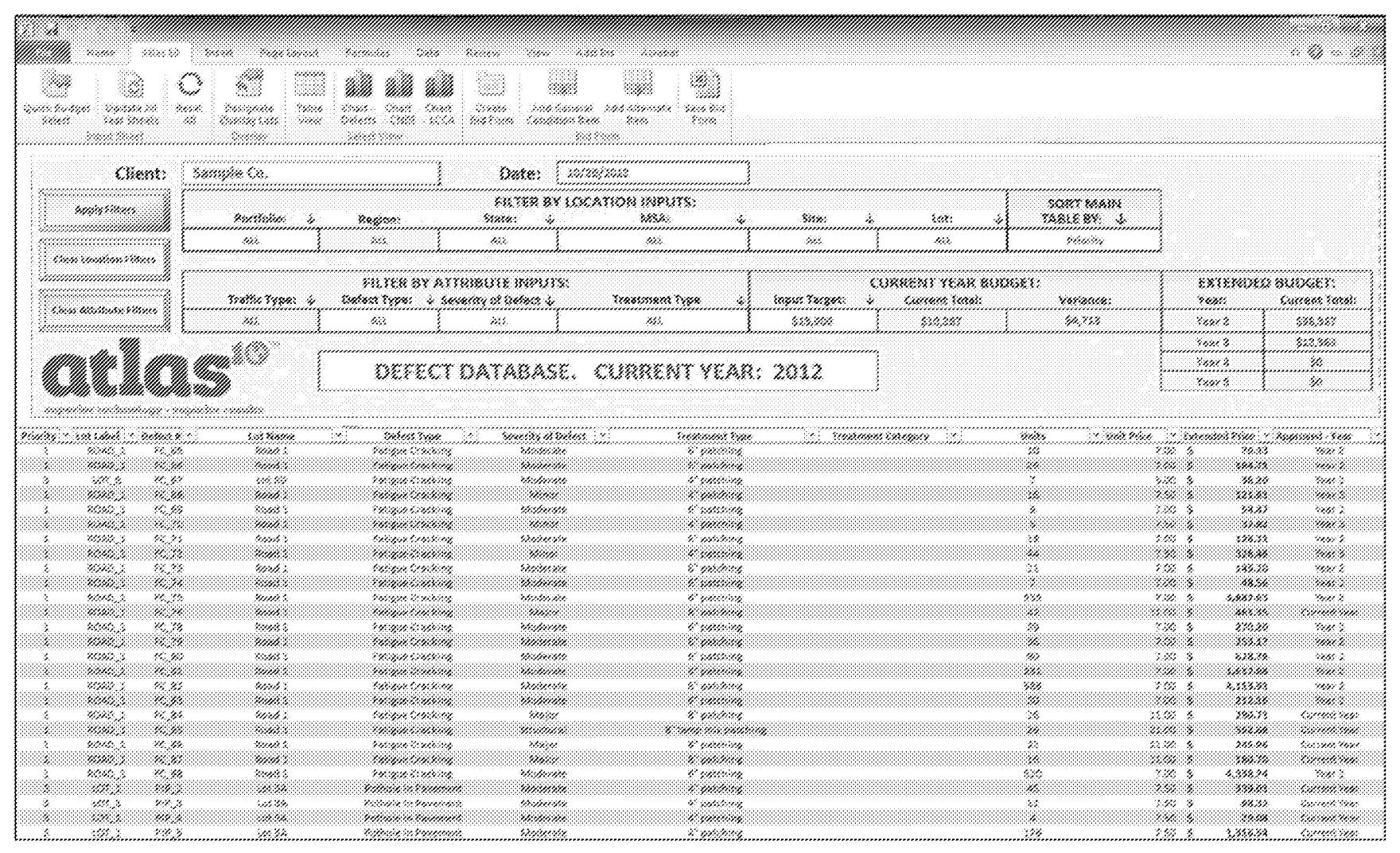
Figure 7:
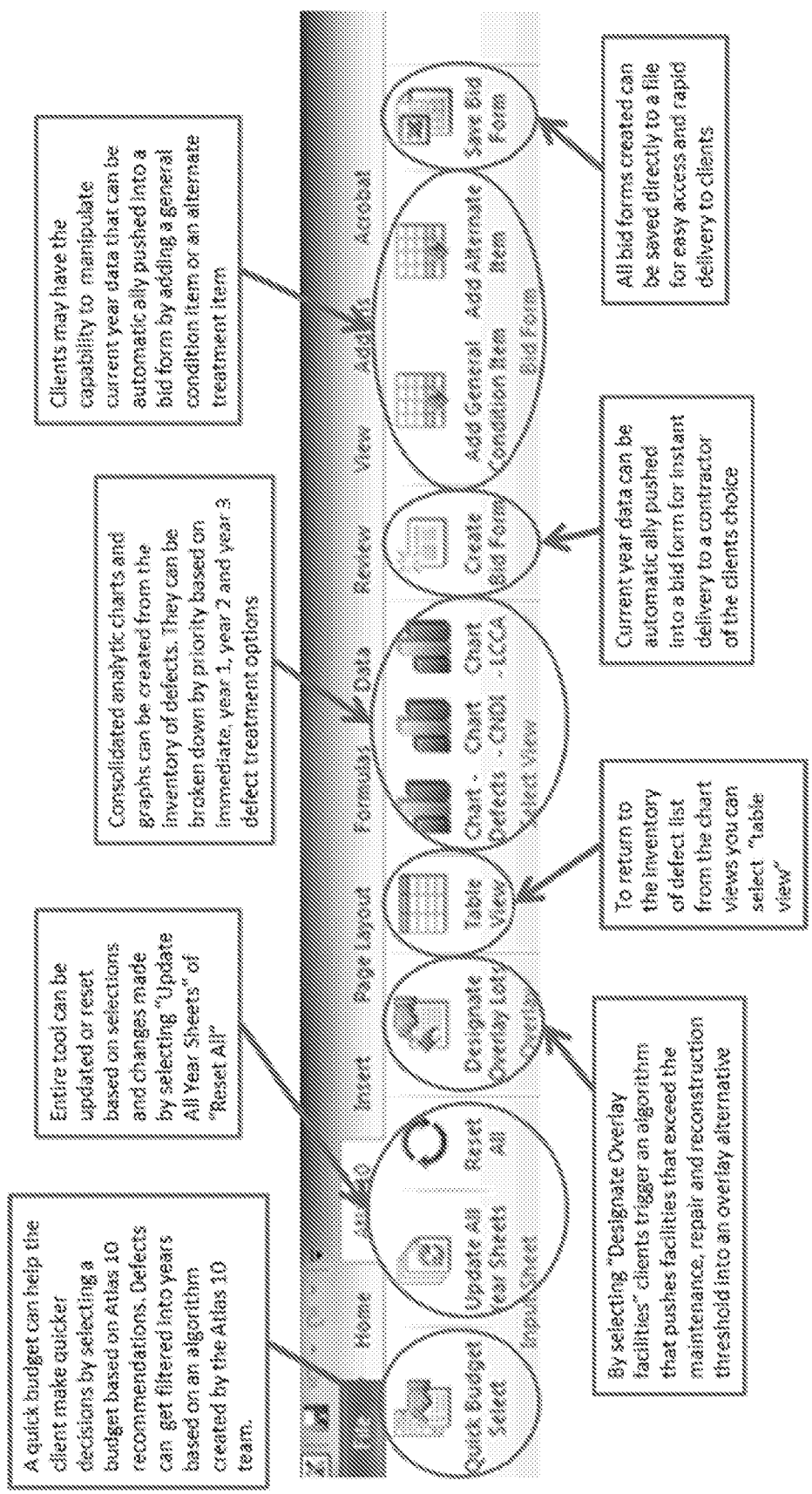
FIGS. 7-8 depict example functionalities of the report illustrated in FIG. 6.
Figure 8:
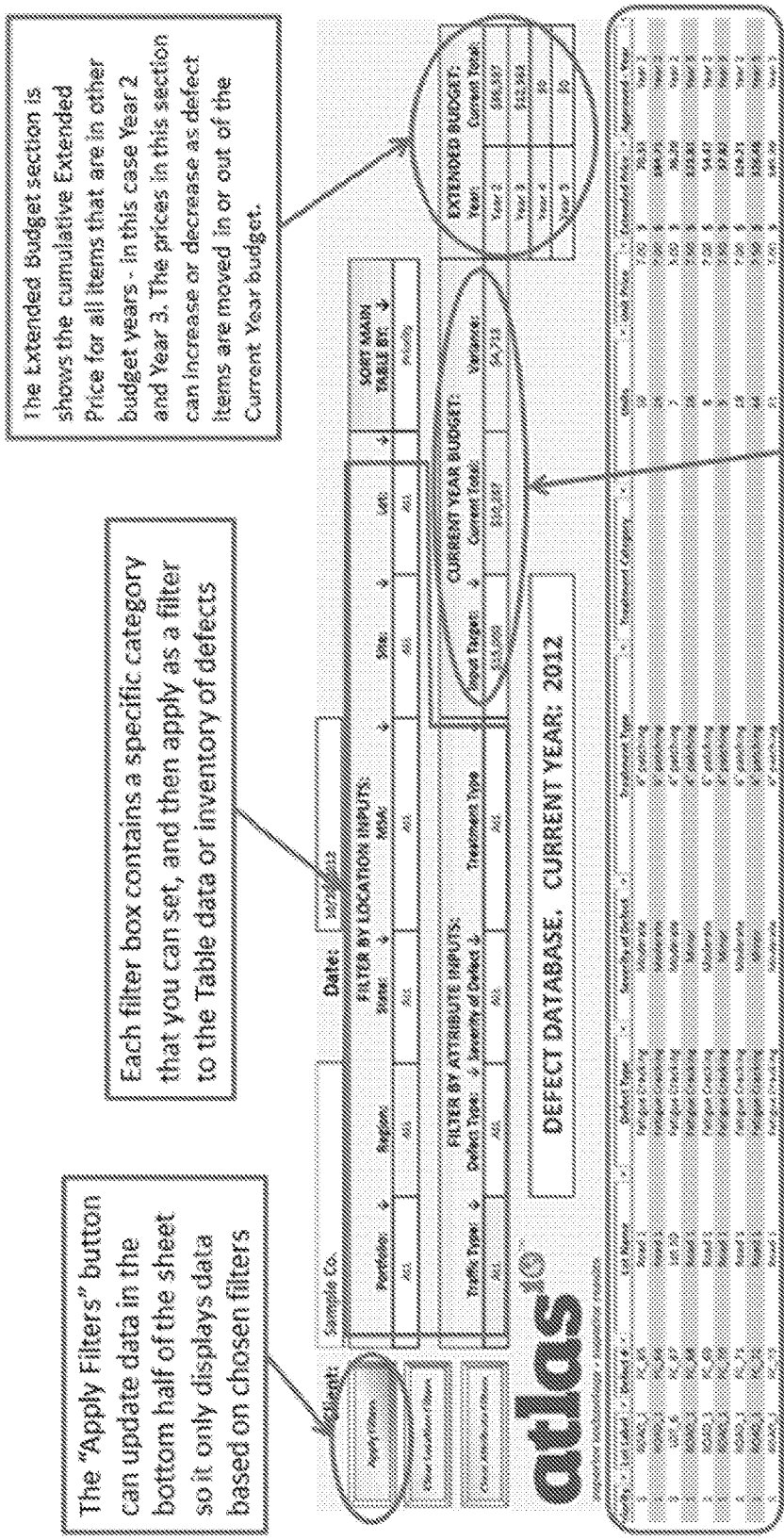

The reporting 160 can be provided by the property defect management system 102 in an electronic format. A portion of an example report is depicted in FIG. 6. All building and grounds defects are listed for the user to filter, sort and analyze the impact of unlimited different treatment scenarios. Filter and sort tools are built-in to simplify the process of evaluating multi-year budgets. Additional example functionality of the report is depicted in FIG. 7 and FIG. 8, although other functionality can be provided without departing from the scope of the current disclosure.

Figure 10:
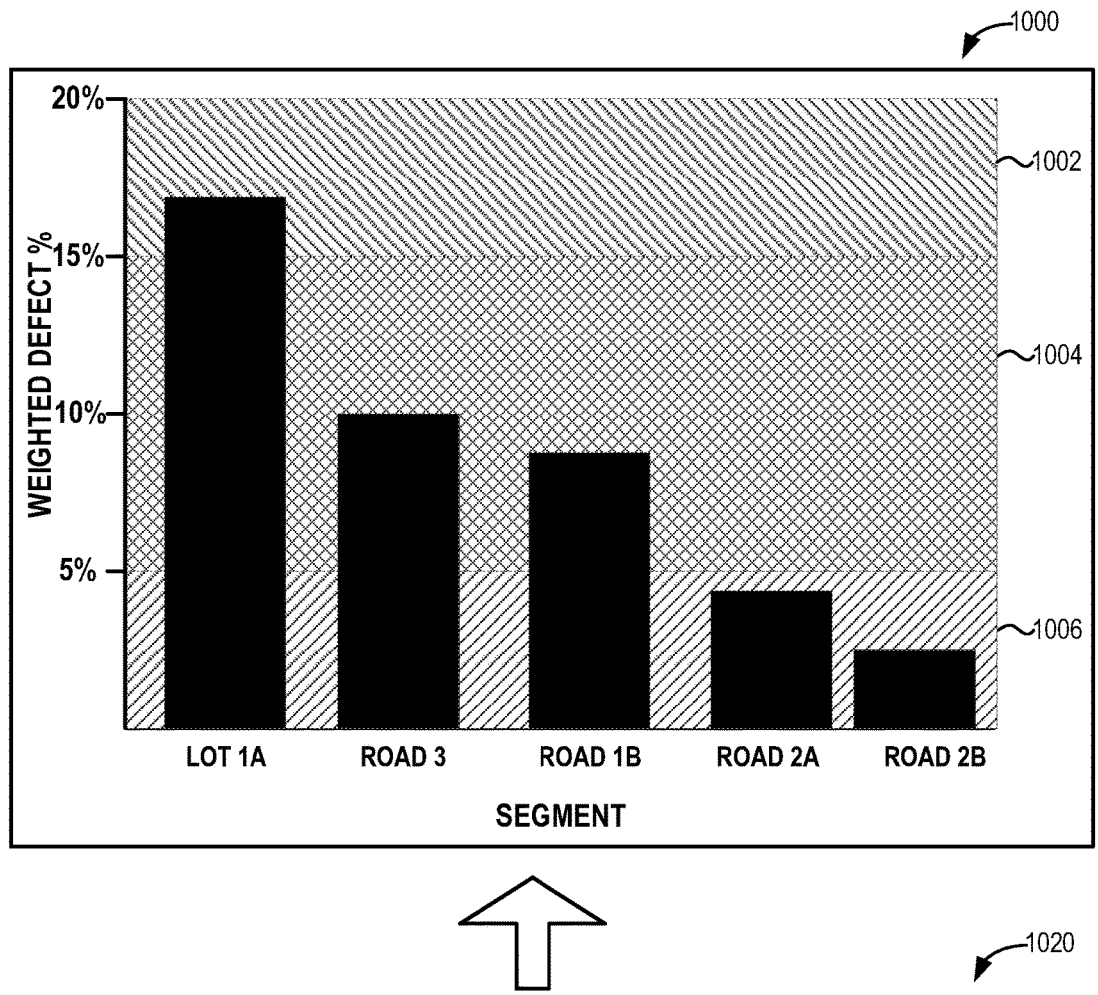
FIG. 10 illustrates an example graph that can be generated by a property defect management system.

Data processing can also be used to generate specific tables that convey the costs associated with various defects. In some embodiments, as depicted by the example maintenance, repair, reconstruction (MRR) cost table shown in FIG. 9, an overview of the financial costs can be separated by priority (i.e., the rows) and by the type of treatment needed (i.e., the columns). The data provided in the various cells of the MRR cost table can be based on the survey data 150, the pre-survey data 134 and pricing per defect information. FIG. 10 illustrates an example graph that can be generated by the property defect management system 102 that conveys the overall status of various segments of a facility based on their weighted percentage of defects. The graph 1000 includes a maintenance band 1006, a repair band 1004, and a reconstruction band 1002. While the thresholds between the bands are illustrated at 5% and 15%, other embodiments can use different thresholds. The illustrated graph visually conveys the weighted defect percentage for a plurality of segments of an example parking facility, namely Lot 1A, Road 3, Road 1B, Road 2A and Road 2B. The names of the segment can be provided by the user as part of the pre-survey data 134 (FIG. 1). The numerical indication is the segment's relative priority. The weighted defect percentage can be determined by the property defect management system 102 using a table similar to the table 1020 illustrated in FIG. 10. The table 1020 includes each segment's total square footage (as determined by aerial maps or surveying, for example) and square footage for various types of defects (as determined by a surveyor walking the perimeter of the defect while operating a handheld data collection device). The table 1020 can combine various types of defects across a particular segment to determine a weighted defect percentage for the segment. Therefore, the graph 1000 provides a visual overview of the relative condition of particular segments of a facility and also conveys a recommended course of action for that segment, namely to perform maintenance, perform repair, or to perform reconstruction on the segment. While note shown in FIG. 10, the property defect management system 102 can also convey other information, such as the percentage of segments in each category. The particular graph and table illustrated in FIG. 10 are merely to convey one example technique for conveying defect information to a user in a way that should be easy to interpret and use for decision making. Other embodiments, can present the information in different arrangements, or using different presentation techniques, without departing from the scope of the present disclosure. For example, some embodiments present the processing information in accordance with PCI ASTM D6433-11 standard, as described above. Nevertheless, analytics similar to those shown in FIG. 10 can graphically convey the percentage of a property that is in Maintenance, Repair, or Reconstruction as a decision making tool.

The property defect management system 102 can also provide an interactive budget summary to a user for display on a computing device, such as computing device 164 (FIG. 1) for example. In some embodiments, the interactive budget summaries include a maintenance budget summary, a repair budget summary, and a reconstruction budget summary. FIGS. 11A-11D depict an example simplified interaction with a maintenance budget summary 1100. As is to be readily appreciated, the maintenance budget summary 1100 has been greatly simplified for the ease of explanation and illustration. Maintenance budget summaries generated in accordance with the presently disclosure, especially for corporations managing a large number of facilities, will be more complex than the simple example budget summary presented herein. Nevertheless, the techniques described below for eliminating budget variances and other long term budgetary planning can be used with such complex and multi-faceted budgets.

Figure 11A:
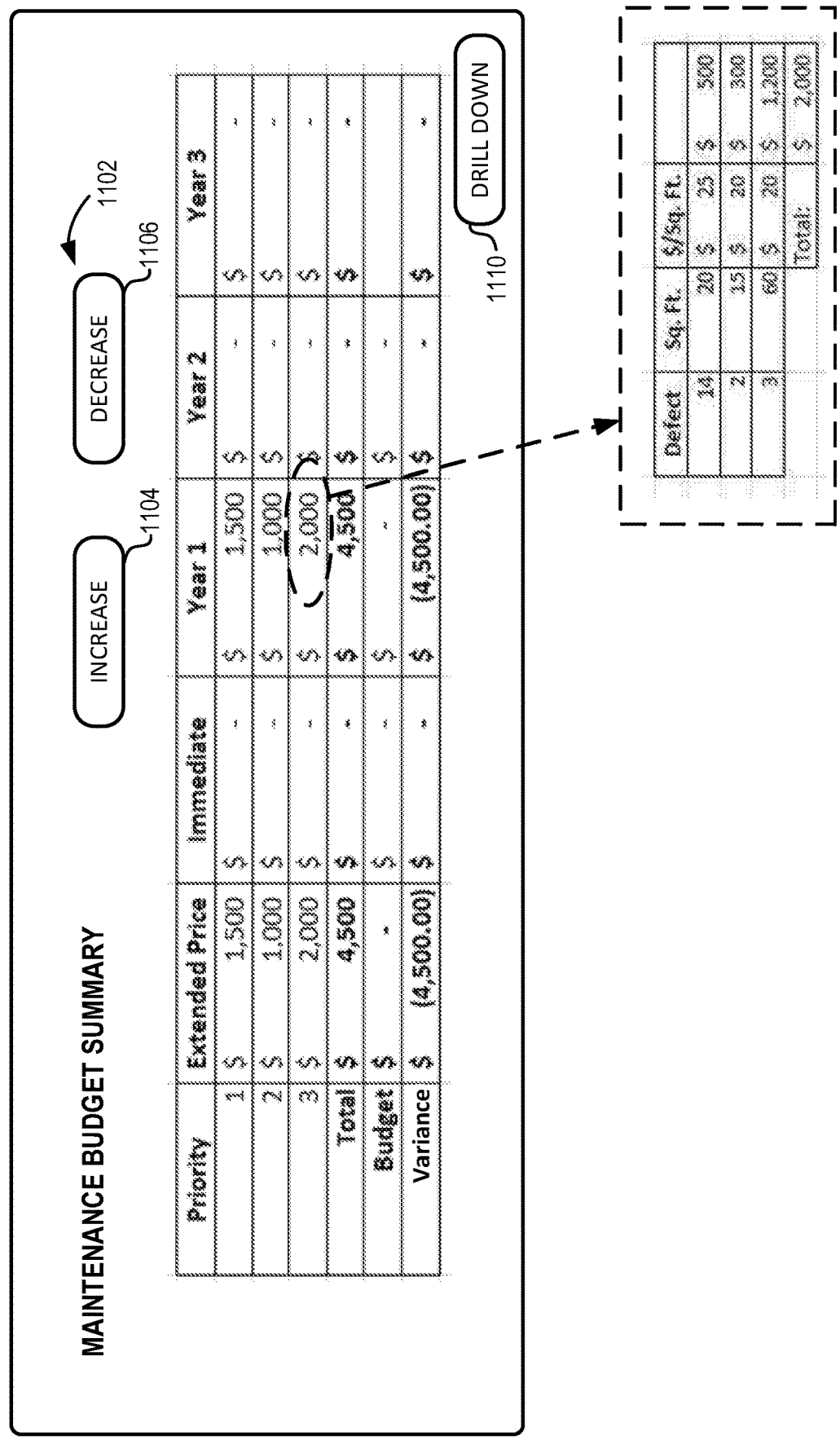

Referring now the FIG. 11A, the line items in the example maintenance budget summary 1100 are separated by priority and year. The particular amounts listed in the summary can be based on the type of defect identified during the survey, the size of the defect, the price to address the defect, and so forth, as indicated by the $2000 entry in Year 1. The particular defects that are included in any particular year can be based on, for example, the treatment schedule delineated in FIG. 5 and based on the rating of the particular defect. In other words, the property defect management system 102 can generally "auto populate" this maintenance budget summary 1100 based on the survey data, user preferences, treatment schedules, and other parameters. Using the drill down button 1110 a user can see a reporting of the various defects that are associated with each line item, as well as a comprehensive summary of each defect. Therefore, through interactions with the maintenance budget summary 1100, a facility manager can view recommended treatments over a multi-year period, based on real-word data, with each line item supported by additional reporting, such as defect photographs. Such information can be accessed via any suitable computing device, such as via a web browser or a dedicated application that is executed on a smartphone, for example.

Figure 11D:
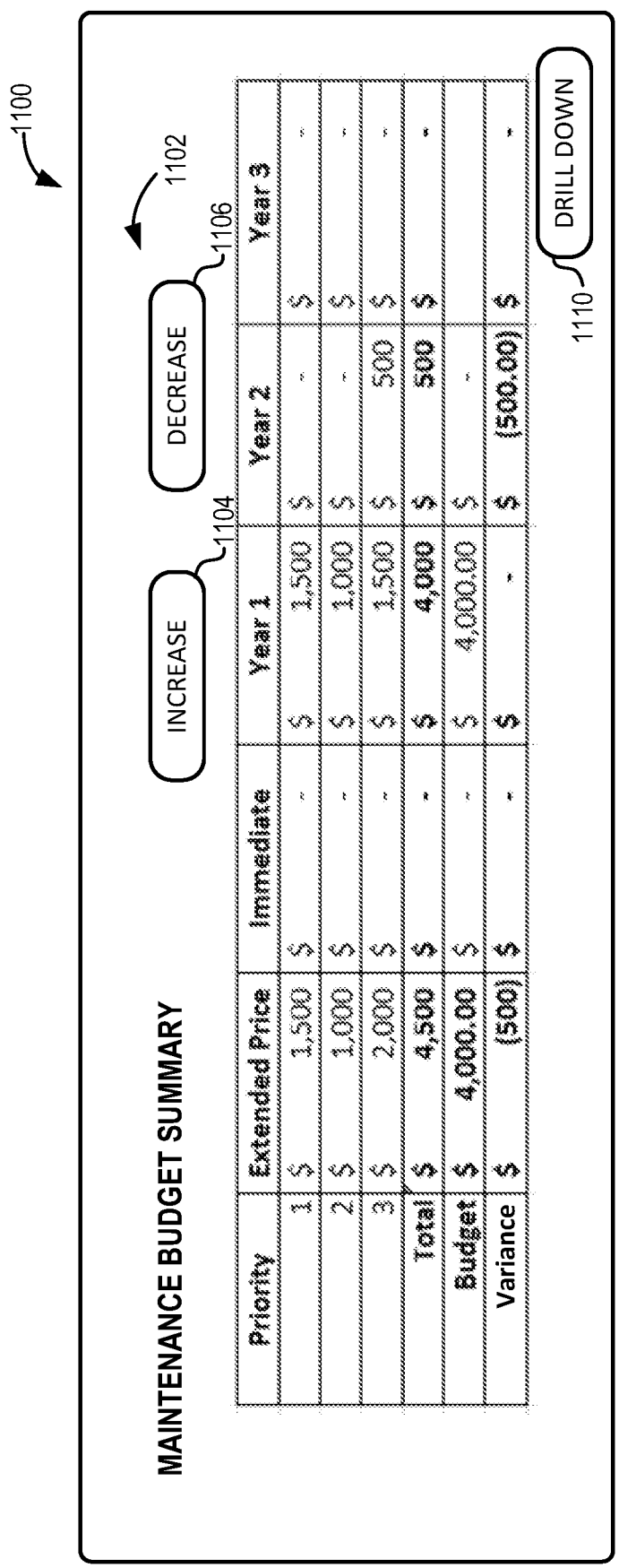

As illustrated in FIG. 11B, a user can supply a budgetary information to the system. For the ease of explanation, a budgetary amount of $4000 is shown for Year 1. It is to be appreciated, however, that a user can supply budgets for more than one year, or supply budgets for other periods of time (i.e, quarterly budgets). In the illustrated example, since the system has recommended that $4,500 worth of repairs be performed in Year 1 and the budget for the same time period is $4000, a $500 variance is identified on maintenance budget summary 1100. In accordance with the present disclosure, a user may interact with the maintenance budget summary 1100 using the interactive elements 1102 (shown as an increase button 1104 and a decrease button 1106) to have the system reduce, or eliminate the budgetary variance. Generally, through iteratively moving lower priority treatments to different budget years, the system can attempt to reduce the expected spend for a particular year. In some embodiments, each time a user selects the decrease button 1106 for a particular line item, the lowest priority treatment associated with that treatment is moved to the next treatment year. Thus, each time user "clicks" the decrease button 1106, another treatment is moved from one yearly budget to a different yearly budget. FIGS. 11C-11D illustrate an example deferral of a treatment to solve for the $500 variance utilizing the decrease button 1106. Referring first to FIG. 11C, in order to remedy the variance in the budget, the user selects one of the cells and then select the decrease button 1106. In the illustrated embodiment, as shown in FIG. 11C, cell 1108 has been selected by the user. Upon receiving the "decrease" command the property defect management system 102 will attempt to defer treatments of one or more defects to another year. In some embodiments, defects having less priority are moved out of the currently selected budget year first, thereby leaving defects with higher priorities in the originally recommended year. FIG. 11D depicts the maintenance budget summary 1100 after one example iteration. As shown, the variance for Year 1 has been addressed by moving a repair for $500 into Year 2. If the first iteration would not have solved the variance, the user could have repeatedly used the decrease button 1106 while having various cells in the Year 1 column selected until an acceptable budget was reached. Instead of moving defects to subsequent years using the decrease button 1106, the process can be generally reversed using the increase button 1104.

It is also noted that while in the illustrated embodiment, the $500 action item was moved to Year 2 in the maintenance budget summary 1100, in some situations, deferring a repair to a subsequent year may move that particular defect to a different budget summary. For example, a defect can be considered a maintenance issue in the current year, but if there is a delay in addressing the issue, it can turn into a repair issue. As such, the cost associated with addressing the issue may rise if the user chooses to defer that defect. The property defect management system 102 beneficially can track such information and convey it to the user so that the user can make educated budgetary considerations for immediate needs, the current year and many years to come.

As is to be readily appreciated, in certain embodiments, the functionally offered by the increase button 1104 and a decrease button 1106 can be alternatively provided using different types of interactive elements. For example, some embodiments can use graphical sliders, dials, or other types of interactive elements.

Once the user is satisfied with the budget, the user can selecting the drill down button 1110 in order to view a detailed breakdown of the line items presented in the maintenance budget summary 1100. Using this feature, the user can have the system generate an itemized list of the recommended action items to address the defects noted during the survey.

Figure 12A:
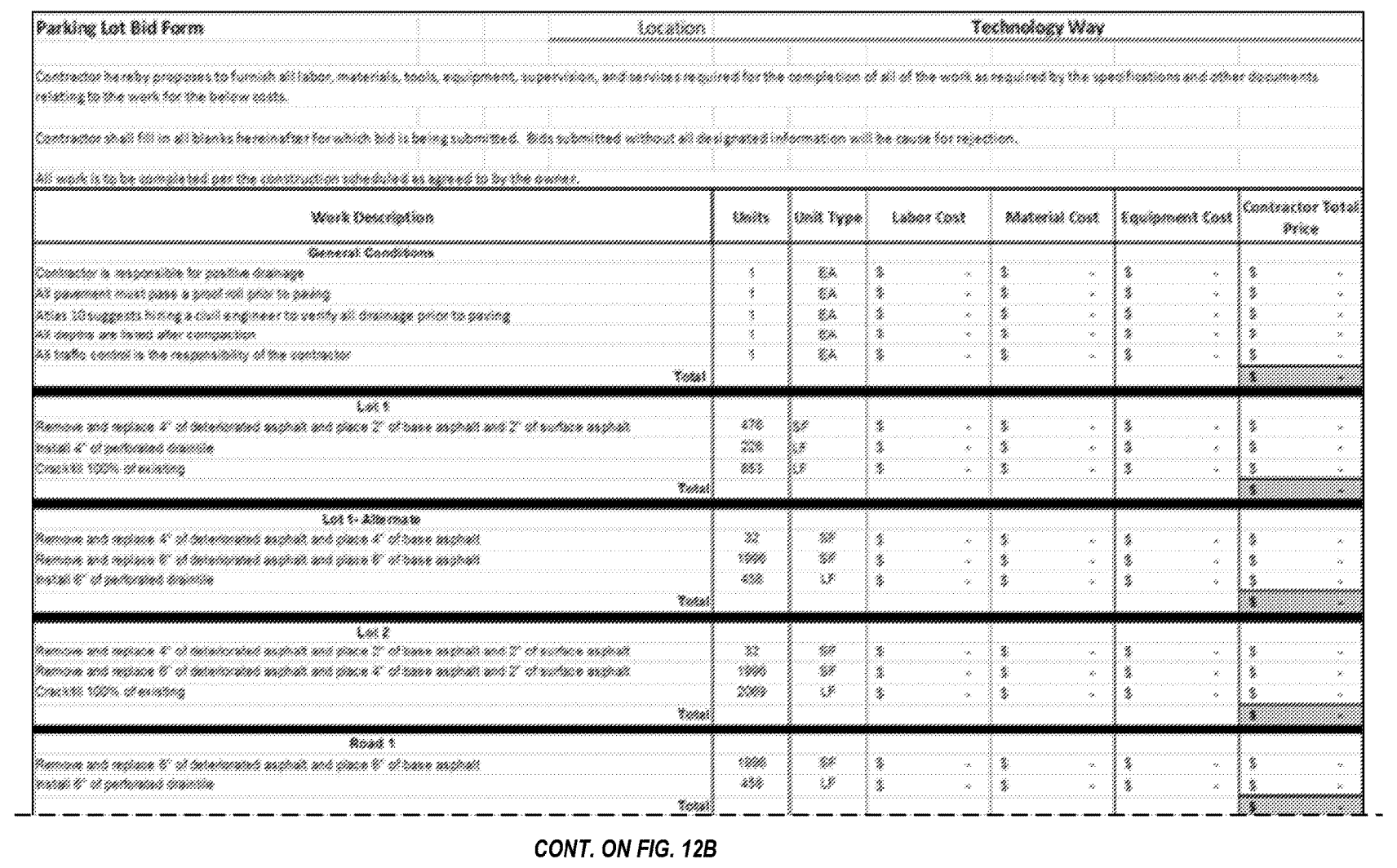
Figure 12B:
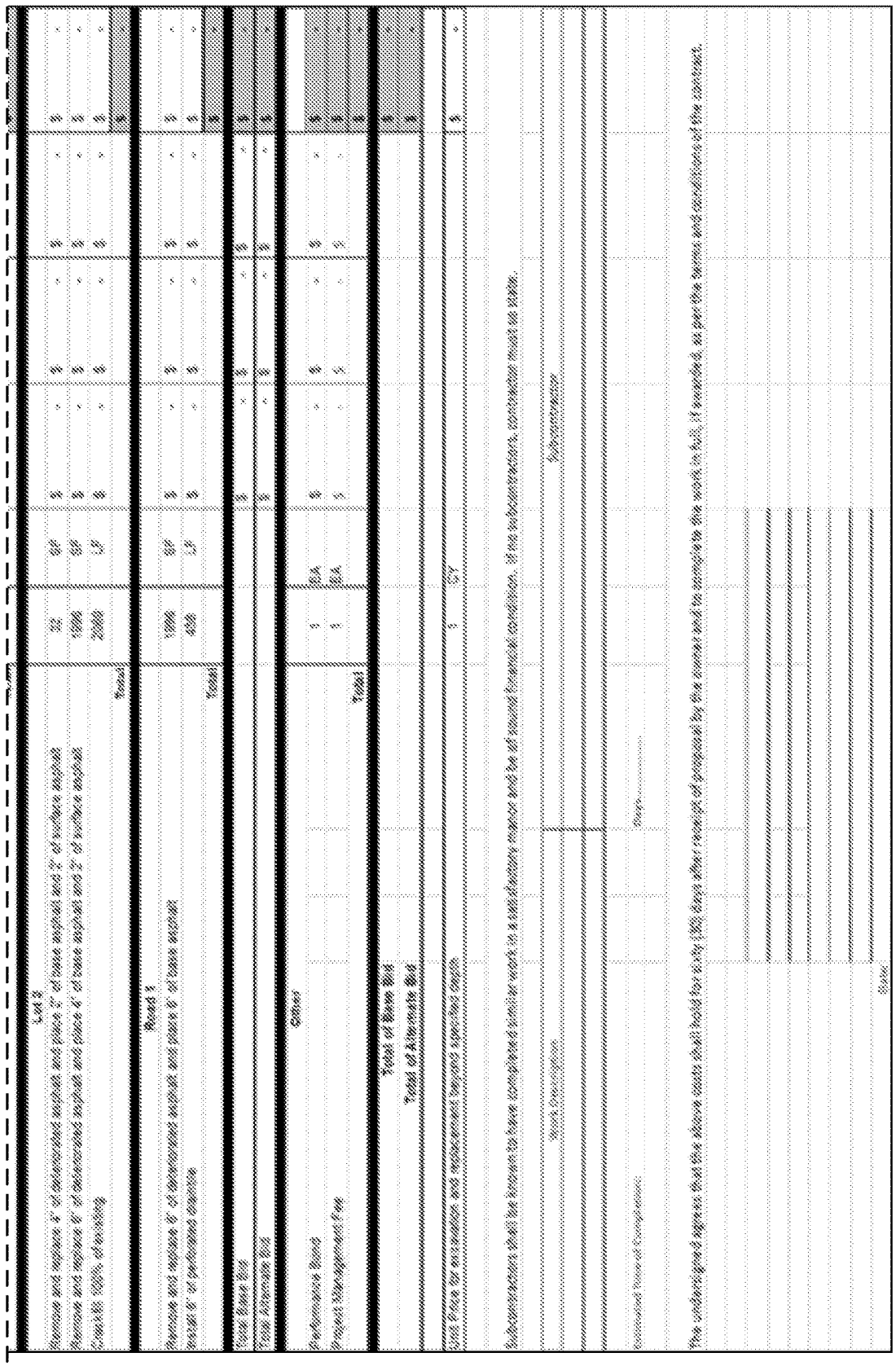

If it is determined that a user wishes to have contractors bid on addressing particular defects, the property defect management system 102 can facilitate the creation of a bid packet comprising bid forms and accompanying materials. The bid form can generally be a spreadsheet that is saved from budget tool spreadsheet. Maps of each segment, as generated by the property defect management system 102 showing defects chosen for repair, can be included in the packet. The maps are to scale to accurately reflect the property and the identified defects. The maps can be in appropriate format to allow for a contractor to utilize digital takeoff estimating software. Additionally, instructions for bidder along with repair specifications for each type of repair listed on bid form. An example bid form for a particular set of defect repair is depicted in FIGS. 12A-12B. Various parts of the bid form can be automatically populated. The description of work included in the "Work Description" column can be pulled from the example table of treatments depicted in FIG. 5, as described above. The "Units", typically expressed in square feet or linear feet, can be based on the geospatial data collected by the surveyor during the field survey, as shown in FIG. 2. Generally, the property defect management system 102 can facilitate the generation of scope of work documents, such as, bid forms and specifications, based on actual surveyed defects to standardize the purchasing process for facility maintenance personnel.

Figure 13:
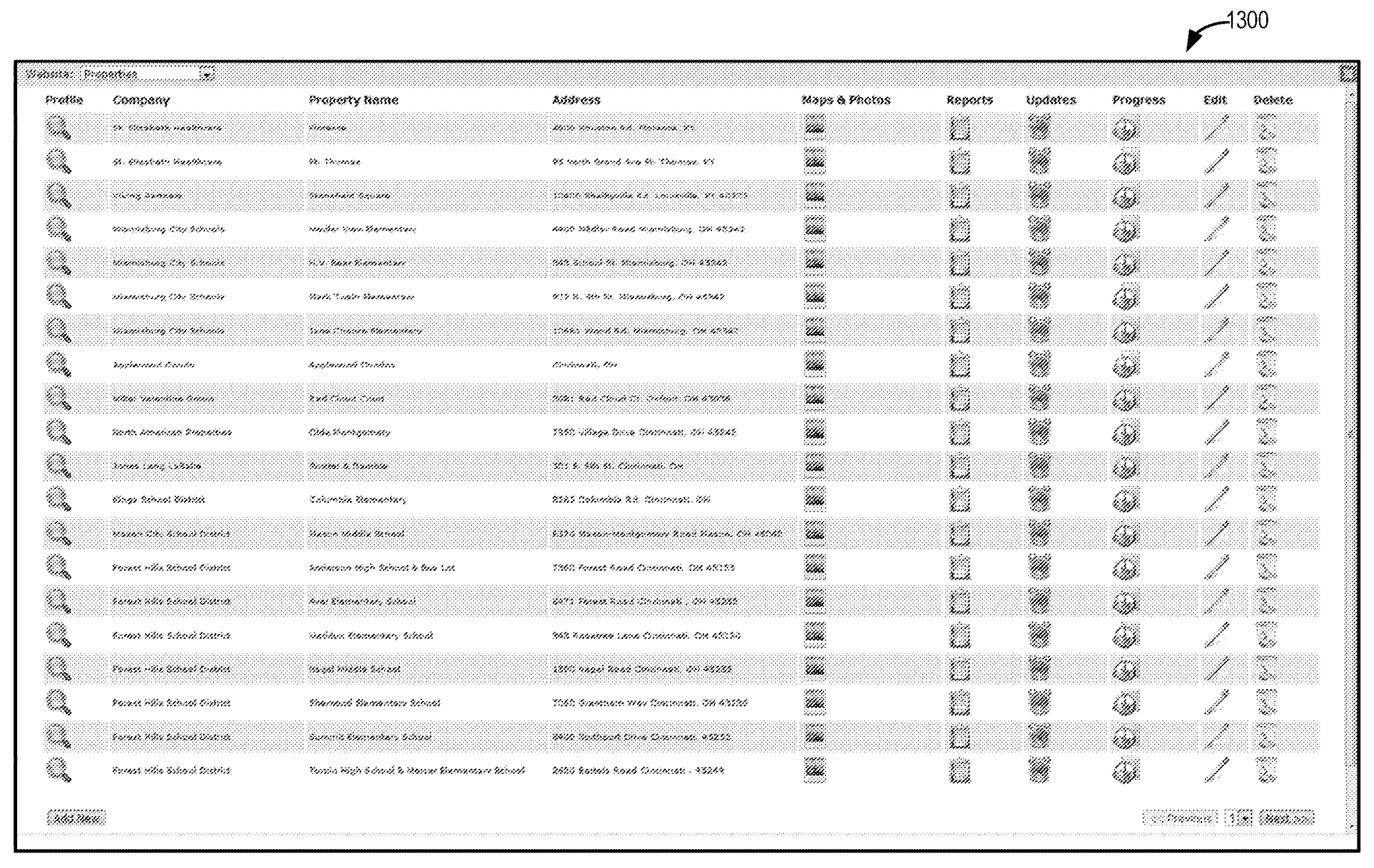

In other embodiments, the property defect management system 102 can host a content management system (CMS). FIG. 13 depicts an example user interface 1300 of a CMS in accordance with one non-limiting embodiment. The user interface 1300 can be viewable on a smartphone, tablet computer, mobile device, desktop computer, and the like. Generally, the CMS can allow various users, such as property managers, administrators, clients, and contractors to view certain data. For example, property managers can upload bid forms (such as the bid form illustrated in FIGS. 12A-12B) to the CMS. Contractors can then download the bid form and accompanying information, such as digital maps and repair specifications. The contractor can then fill out pricing for each repair type area identified on the bid form and upload the populated bid form spreadsheet back to CMS. The property manager can view populated bid forms and compare pricing.

In accordance with present disclosure, the CMS can be used to facilitate other types of bidding. For example, a property manager can engage in a reverse auction using the bid form, where contractors bid against each other for a particular duration of time, with the lowest bid winning the contract. In other embodiments, the CMS can be used to facilitate "crowd sourcing," where multiple contractors work together to generate a single bid for a particular job. The CMS can also facilitate group purchasing, where multiple property owners collaborate to seek quotations for similar types of work. For example, two retail establishments that are physically situated close to each may both be in need of an overlay. Instead of individually seeking bids for the work, the two retail establishments can collaborate through the CMS to seek contractors to perform both overlays as part of a single job, thereby benefiting from the synergies that come with larger scale jobs. The CMS can be used to manage such reverse auction, crowd sourcing, and group purchasing scenarios. In yet other embodiments, the CMS can facilitate a software-as-a-server lead generation platform. For example, as bid forms are uploaded to the CMS by users, contractors can pay a membership fee, or other type of fee, to have access to the bid forms. The system can track profiles of member contractors and route bid forms fitting contractor parameters to the various member contractors.

Figure 14:
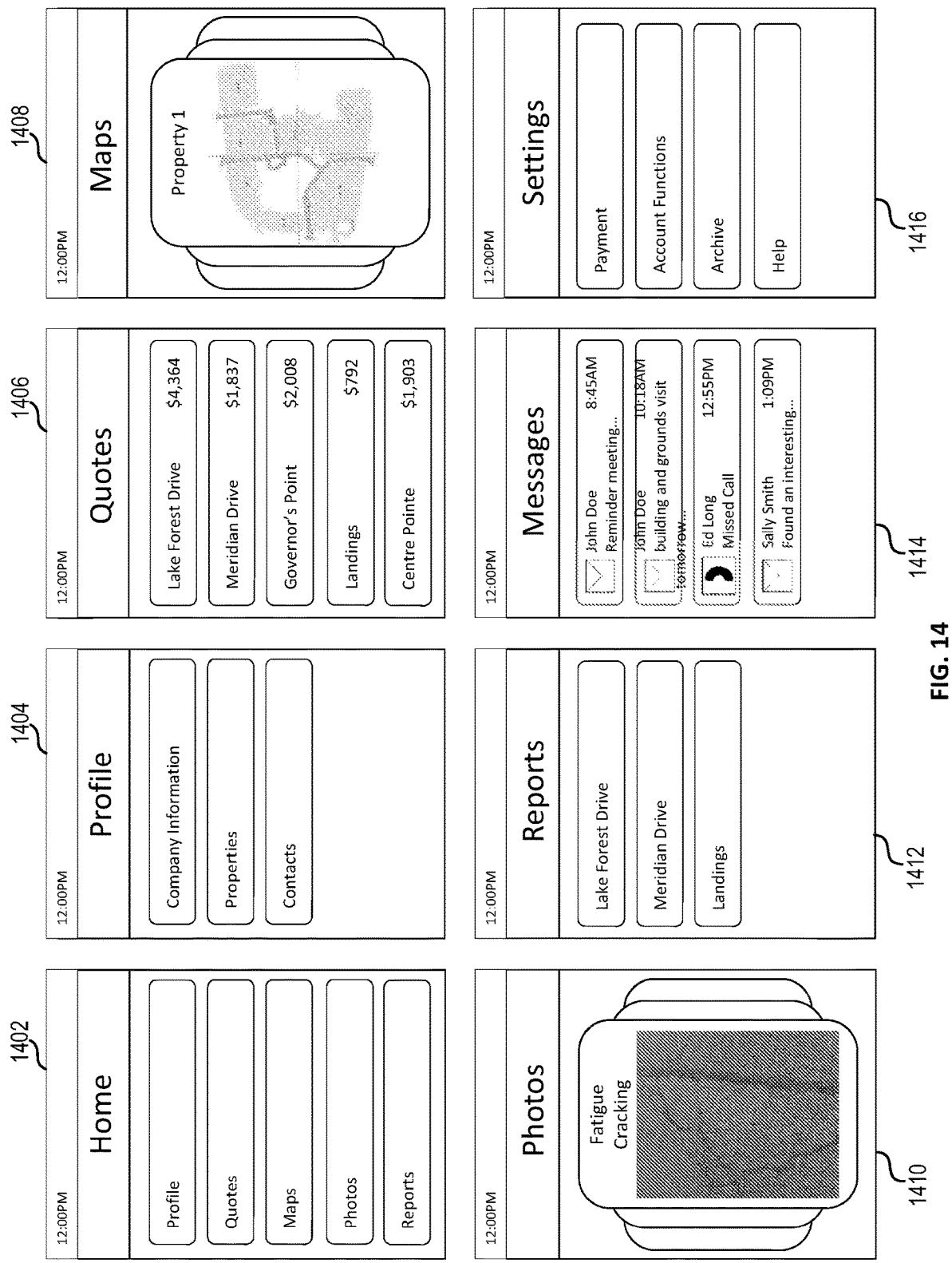
FIG. 14 depicts example user interfaces of the content management system on a mobile device, such as a smartphone.

FIG. 14 depicts example user interfaces of the CMS for display on a smartphone in accordance with non-limiting examples. The interfaces can be displayed by an application executing on the smartphone in the communication with the property defect management system 102. Screen 1402 is a home screen that gives the user various options, such as view the user's profile, view quotes, view maps, view phones and view reports. Screen 1404 is a profile screen which generally allows a user to view company information, property information, among other data. Screen 1406 allows the user to view quotations, grouped by property. Screen 1408 allows a user to view and interact with scaled maps that visually present defects and the property. The user can use filtering tools to restrict the type of information displayed on the map. Screen 1410 allows the user to view imagery, such as photos/videos, of particular defect that were captured by the surveyor with the handheld data capture device. In some embodiments, the user can capture images of defects and send the defects to the property defect management system 102 as a geo-tagged image file. Thus, if a user is at a property and noticing a particular defect, they can capture imagery of the defect with the camera on their smartphone (such as with a photo and/or video) and transmit the imagery to the system for further processing. Screen 1412 presents a listing of available defect reports for various properties. Screen 1414 depicts a messaging platform built into the application and screen 1416 depicts various setting which can be controlled by the user.

In general, it will be apparent to one of ordinary skill in the art that at least some of the embodiments described herein can be implemented in many different embodiments of software, firmware, and/or hardware. The software and firmware code can be executed by a processor or any other similar computing device. The software code or specialized control hardware that can be used to implement embodiments is not limiting. For example, embodiments described herein can be implemented in computer software using any suitable computer software language type, such as, for example, conventional or object-oriented techniques. Such software can be stored on any type of suitable computer-readable medium or media, such as, for example, a magnetic or optical storage medium. The operation and behavior of the embodiments can be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes described herein can be executed by programmable equipment, such as computers or computer systems and/or processors. Software that can cause programmable equipment to execute processes can be stored in any storage device, such as, for example, a computer system (nonvolatile) memory, an optical disk, magnetic tape, or magnetic disk. Furthermore, at least some of the processes can be programmed when the computer system is manufactured or stored on various types of computer-readable media.

It can also be appreciated that certain portions of the processes described herein can be performed using instructions stored on a computer-readable medium or media that direct a computer system to perform the process steps. A computer-readable medium can include, for example, memory devices such as diskettes, compact discs (CDs), digital versatile discs (DVDs), optical disk drives, or hard disk drives. A computer-readable medium can also include memory storage that is physical, virtual, permanent, temporary, semipermanent, and/or semitemporary.

A "computer," "computer system," "host," "server," or "processor" can be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein can include memory for storing certain software modules used in obtaining, processing, and communicating information. It can be appreciated that such memory can be internal or external with respect to operation of the disclosed embodiments. The memory can also include any means for storing software, including a hard disk, an optical disk, floppy disk, ROM (read only memory), RAM (random access memory), PROM (programmable ROM), EEPROM (electrically erasable PROM) and/or other computer-readable media. Non-transitory computer-readable media, as used herein, comprises all computer-readable media except for transitory, propagating signals.

In various embodiments disclosed herein, a single component can be replaced by multiple components and multiple components can be replaced by a single component to perform a given function or functions. Except where such substitution would not be operative, such substitution is within the intended scope of the embodiments. The computer systems can comprise one or more processors in communication with memory (e.g., RAM or ROM) via one or more data buses. The data buses can carry electrical signals between the processor(s) and the memory. The processor and the memory can comprise electrical circuits that conduct electrical current. Charge states of various components of the circuits, such as solid state transistors of the processor(s) and/or memory circuit(s), can change during operation of the circuits.

Some of the figures can include a flow diagram. Although such figures can include a particular logic flow, it can be appreciated that the logic flow merely provides an exemplary implementation of the general functionality. Further, the logic flow does not necessarily have to be executed in the order presented unless otherwise indicated. In addition, the logic flow can be implemented by a hardware element, a software element executed by a computer, a firmware element embedded in hardware, or any combination thereof.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

What is claimed is:

1. A system for pavement defect tracking, comprising:
a data collection device comprising a global navigation satellite system (GNSS) receiver configured to generate location data for the data collection device and an imaging device configured to capture digital imagery; and
a pavement defect management computing system, the pavement defect management computing system comprising at least one processor and non-transitory computer readable medium having instructions stored thereon which when executed by the at least one processor cause the at least one processor to:
store a plurality of different treatment approaches in a memory;
receive pre-survey data, wherein the pre-survey data identifies one or more pavement characteristics of the paved property;
receive survey data from the data collection device operated at a paved property, wherein the survey data comprises geospatial information and digital imagery for each of a plurality of pavement defects of the paved property, wherein the survey data is associated with a geographic path of travel of the data collection device at the paved property during operation at the paved property, wherein the plurality of pavement defects of the paved property comprises one or more linear pavement defects and one or more polygon pavement defects, and wherein for linear pavement defects the survey data describes the length of the linear pavement defect, and wherein for polygon pavement defects the survey data describes the perimeter of the polygon pavement defect; and
based on the survey data, determine dimensional detail for each of the plurality of pavement defects, wherein the dimensional detail comprises a defect length for each of the one or more linear pavement defects and the dimensional detail comprises a defect area for each of the one or more polygon pavement defects;
select a treatment approach from the plurality of treatment approaches for each of the plurality of pavement defects, wherein for each of the plurality of pavement defects, the selected treatment approach is based at least partially on the dimensional detail of the pavement defect;
visually convey on a map of the paved property geographic locations of each of the plurality of pavement defects; and
generate a maintenance, repair, reconstruction (MRR) cost table comprising a plurality of costs associated with the plurality of pavement defects of the paved property, wherein the plurality of costs are separated by priority and by treatment approach, wherein the plurality of costs are based on the (i) survey data, (ii) the pre-survey data, and (iii) pricing per defect information.

2. The system for pavement defect tracking of claim 1, wherein the survey data comprises classification information for one or more of the plurality of pavement defects.

3. The system for pavement defect tracking of claim 2, wherein the classification information comprises a severity rating of the pavement defect.

4. The system for pavement defect tracking of claim 1, wherein selected treatment approach comprises a cost of treatment, wherein the cost of treatment is based at least partially on the dimensional detail of the pavement defect.

5. The system for pavement defect tracking of claim 1, wherein the instructions further cause the at least one processor to:
generate a bid package based on the survey data, wherein the bid package identifies at least one of the plurality of pavement defects and the selected treatment approach for of the identified pavement defect.

6. A computer-based method for pavement defect tracking based on survey data from a data collection device, the data collection device comprising a global navigation satellite system (GNSS) receiver configured to generate location data for the data collection device and an imaging device configured to capture digital imagery, the method comprising:
storing, by pavement defect management computing system, a plurality of different treatment approaches in a memory;
receiving, by the pavement defect management computing system, pre-survey data, wherein the pre-survey data identifies one or more pavement characteristics of the paved property;
receiving, at the pavement defect management computing system and from the data collection device operated at a paved property, survey data from the paved property, wherein the survey data comprises geospatial information and digital imager for each of a plurality of pavement defects of the paved property, wherein the survey data is associated with a geographic path of travel of the data collection device at the paved property, wherein the plurality of pavement defects of the paved property comprises one or more linear pavement defects and one or more polygon pavement defects, and wherein for linear pavement defects the survey data describes the length of the linear pavement defect, and wherein for polygon pavement defects the survey data describes the perimeter of the polygon pavement defect;
based on the survey data, determining, by the pavement defect management computing system, dimensional detail for each of the plurality of pavement defects, wherein the dimensional detail comprises a defect length for each of the one or more linear pavement defects and the dimensional detail comprises a defect area for each of the one or more polygon pavement defects;
selecting, by the pavement defect management computing system, a treatment approach from the plurality of treatment approaches for each of the plurality of pavement defects, wherein for each of the plurality of pavement defects, the selected treatment approach is based at least partially on the dimensional detail of the pavement defect;
visually convey on a map of the paved property a geographic location of each of the plurality of pavement defect;
generate a maintenance, repair, reconstruction (MRR) cost table comprising a plurality of costs associated with the plurality of pavement defects of the paved property, wherein the plurality of costs are separated by priority and by treatment approach, wherein the plurality of costs are based on the (i) survey data, (ii) the pre-survey data, and (iii) pricing per defect information.

7. The computer-based method for pavement defect tracking of claim 6, wherein the survey data comprises classification information for one or more of the plurality of pavement defects.

8. The computer-based method for pavement defect tracking of claim 7, wherein the classification information comprises a severity rating of the pavement defect.

9. The computer-based method for pavement defect tracking of claim 6, further comprising:
generating, by the pavement defect management computing system, a bid package based on the survey data, wherein the bid package identifies at least one of the plurality of pavement defects and the selected treatment approach for the identified pavement defect.

10. The computer-based method for pavement defect tracking of claim 6, wherein the selected treatment approach comprises a cost of treatment, wherein the cost of treatment is based at least partially on the dimensional detail of the pavement defect.

* * * * *

UNITED STATES PATENT AND TRADEMARK OFFICE
CERTIFICATE OF CORRECTION

| | | |
|---|---|---|
| PATENT NO. | : 11,783,438 B2 | |
| APPLICATION NO. | : 17/363426 | |
| DATED | : October 10, 2023 | |
| INVENTOR(S) | : Mark Hamilton Schmidt | |

It is certified that error appears in the above-identified patent and that said Letters Patent is hereby corrected as shown below:

In the Claims

Column 17, Claim 5, Line 20, change "for of the" to --for the--.
Column 18, Claim 6, Line 19, change "defect;" to --defects; and--.

Signed and Sealed this
Nineteenth Day of December, 2023

Katherine Kelly Vidal
*Director of the United States Patent and Trademark Office*